(12) United States Patent
Warkentin et al.

(10) Patent No.: US 9,952,990 B2
(45) Date of Patent: *Apr. 24, 2018

(54) IMPLEMENTING PSEUDO NON-MASKING INTERRUPTS BEHAVIOR USING A PRIORITY INTERRUPT CONTROLLER

(71) Applicant: VMWARE, INC., Palo Alto, CA (US)

(72) Inventors: Andrei Warkentin, Palo Alto, CA (US); Irfan Ulla Khan, Bangalore (IN); Cyprien Laplace, Palo Alto, CA (US); Harvey Tuch, Palo Alto, CA (US); Alexander Fainkichen, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/876,845

(22) Filed: Oct. 7, 2015

(65) Prior Publication Data

US 2016/0378699 A1    Dec. 29, 2016

(30) Foreign Application Priority Data

Jun. 27, 2015 (IN) .......................... 3253/CHE/2015

(51) Int. Cl.
*G06F 13/24* (2006.01)
*G06F 13/00* (2006.01)
*G06F 13/26* (2006.01)

(52) U.S. Cl.
CPC .................................. *G06F 13/26* (2013.01)

(58) Field of Classification Search
None
See application file for complete search history.

(56) References Cited

U.S. PATENT DOCUMENTS

| | | | | | |
|---|---|---|---|---|---|
| 5,497,494 | A | * | 3/1996 | Combs | G06F 9/4418 713/321 |
| 5,684,997 | A | * | 11/1997 | Kau | G06F 13/24 710/260 |
| 6,223,293 | B1 | * | 4/2001 | Foster | G06F 1/24 710/15 |
| 6,298,410 | B1 | * | 10/2001 | Jayakumar | G06F 13/24 710/261 |

(Continued)

*Primary Examiner* — Michael Sun
(74) *Attorney, Agent, or Firm* — Patterson + Sheridan, LLP

(57) ABSTRACT

A method is provided for handling interrupts in a processor, the interrupts including regular interrupts having a range of priorities and a pseudo non-maskable interrupt (PNMI) that is of a higher priority than any of the regular interrupts. The method includes obtaining an interrupt vector corresponding to a received interrupt, and if the received interrupt is a PNMI, executing a PNMI interrupt handler. If the received interrupt is a regular interrupt, the method further comprises reading a mask flag that indicates whether regular interrupts are enabled in an interrupt controller and further: if the mask flag indicates that regular interrupts are enabled, enabling interrupts in the processor so that a PNMI can be received while handling the regular interrupt, executing, a regular interrupt handler, and disabling interrupts in the processor; and if the mask flag indicates that regular interrupts are disabled, saving the interrupt vector for subsequent handling.

20 Claims, 12 Drawing Sheets

(56) References Cited

U.S. PATENT DOCUMENTS

| | | | | |
|---|---|---|---|---|
| 6,564,339 B1* | 5/2003 | Swoboda | ............ | G06F 11/3656 |
| | | | | 714/25 |
| 6,625,679 B1* | 9/2003 | Morrison | ............ | G06F 13/4022 |
| | | | | 710/260 |
| 6,629,252 B1* | 9/2003 | Gholami | ............... | G06F 9/4812 |
| | | | | 710/260 |
| 2001/0049763 A1* | 12/2001 | Barry | .................... | G06F 9/3861 |
| | | | | 710/264 |
| 2003/0140245 A1* | 7/2003 | Dahan | ................. | G06F 9/30047 |
| | | | | 713/190 |
| 2004/0088704 A1* | 5/2004 | Owen | ................... | G06F 9/4887 |
| | | | | 718/100 |
| 2005/0066096 A1* | 3/2005 | Ruemmler | .......... | G06F 9/30101 |
| | | | | 710/200 |
| 2005/0138257 A1* | 6/2005 | Burdass | ................. | G06F 13/24 |
| | | | | 710/262 |
| 2009/0157936 A1* | 6/2009 | Goss | .................... | G06F 1/3203 |
| | | | | 710/264 |

* cited by examiner

IMPLEMENTING PSEUDO NON-MASKING INTERRUPTS BEHAVIOR USING A PRIORITY INTERRUPT CONTROLLER

RELATED APPLICATIONS

Benefit is claimed under 35 U.S.C. 119(a)-(d) to Foreign application Serial No. 3253/CHE/2015 filed in India entitled "IMPLEMENTING PSEUDO NON-MASKING INTERRUPTS BEHAVIOR USING A PRIORITY INTERRUPT CONTROLLER", on Jun. 27, 2015, by VMware, Inc., which is herein incorporated in its entirety by reference for all purposes.

The present application is related in subject matter to U.S. patent application Ser. No. 14/876,831, which is incorporated herein by reference.

BACKGROUND

A computer's operating system has several interfaces with other components of the computer and the operating system must correctly deal with these interfaces to carry out its functions. One interface is between the operating system and the application programs, and is commonly known as the Application Programming interface (API). Other interfaces include those between the drivers, the memory management unit, the scheduler, and the instruction set architecture (ISA) of the underlying machine. Of these, a change to a different ISA poses difficulties for the operating system, as the operating system generally relies on certain features in the ISA to carry out its functions. One such feature of an ISA is how it handles interrupts, including non-maskable interrupts (NMIs). NMIs are frequently used by the operating system for implementing translation look-aside buffer (TLB) maintenance, for deadlock detection, and for servicing performance monitor counter overflows.

An NMI has certain properties including the following. An NMI should be deliverable during servicing of regular interrupts. An NMI should have higher priority than a regular interrupt. An NMI should be deliverable when regular interrupts are masked. An NMI should not be maskable (i.e., preventable), except under special circumstances. An NMI should be deliverable to an arbitrary CPU and as an inter-processor interrupt (IPI). Finally, an NMI should be deliverable as an arbitrary regular interrupt.

While the x86 ISA is a popular instruction set architecture, the ARM®64 processor and its ISA is becoming increasing popular, especially as processors embedded in mobile devices and IO devices. Devices, such as The ARM®64 Cortex®-A57 commercially available from ARM Holdings of Cambridge, United Kingdom, are multi-core processors with an integral generic interrupt controller (GIC), which offloads certain interrupt processing functions from the ARM processor cores. The GIC receives interrupts from the external world or from software and distributes a regular interrupt request (IRQ) and a fast interrupt request (FIQ) to the one or more of the ARM®64 processor cores. However, the ARM®64 core ISA and the GIC have no concept of an NMI.

SUMMARY

Embodiments provide method of distinguishing between NMI and regular interrupts in a processor having an ISA and a GIC that have no concept of an NMI. As a result, operating system functions that rely on an NMI need not be changed in a host computer system even though its processor is changed to such a processor, e.g., changed from an x86 processor to an ARM®64 processor.

In one embodiment, a method is provided for handling interrupts in a processor, the interrupts including regular interrupts having a range of priorities and a particular interrupt, which has a highest priority relative to the regular interrupts, as a pseudo non-maskable interrupt (PNMI). The method according to this embodiment includes the steps of obtaining an interrupt vector corresponding to a received interrupt, and if the received interrupt is a PNMI, executing a PNMI interrupt handler using the interrupt vector as an input thereto. On the other hand, if the received interrupt is a regular interrupt, the method further comprises the steps of reading a mask flag that indicates whether regular interrupts are enabled in an interrupt controller and further: if the mask flag indicates that regular interrupts are enabled in the interrupt controller, enabling interrupts in the processor so that a PNMI can be received while handling the regular interrupt, executing a regular interrupt handler using the interrupt vector as an input thereto, and disabling interrupts in the processor; and if the mask flag indicates that regular interrupts are disabled in the interrupt controller, saving the interrupt vector for subsequent handling.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
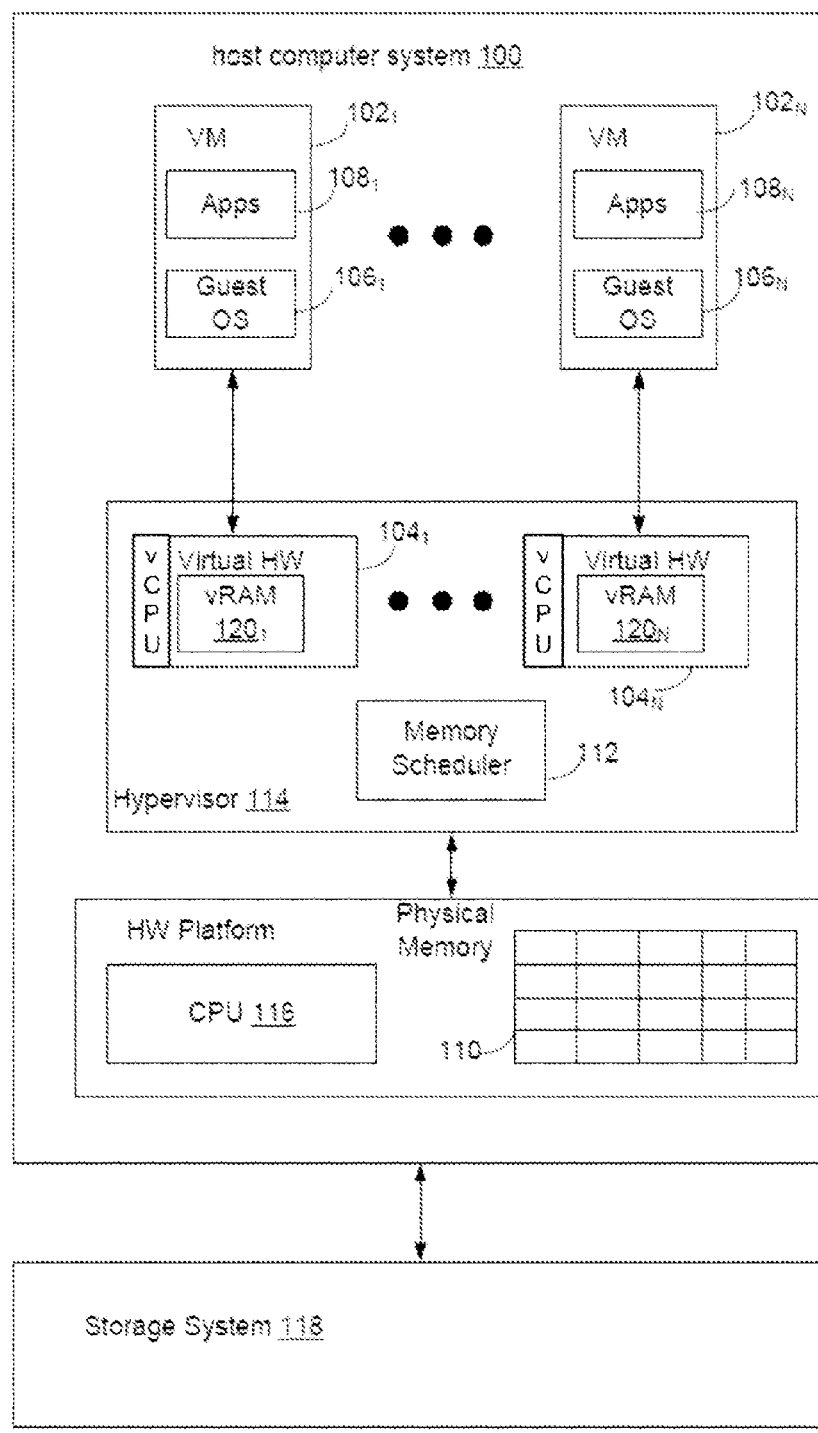
FIG. 1 depicts a host computer system in which embodiments may be implemented.

FIG. 1 depicts a host computer system 100 in which embodiments may be implemented. Host computer system 100 includes one or more CPUs (CPU) 116 and physical memory 110, and is coupled to a storage system 118. Host computer system 100 is also configured with a hypervisor 114, which supports the execution of one or more virtual machines $102_1$-$102_N$ (collectively referred to as virtual machines 102) by emulating virtual hardware $104_1$-$104_N$, each of which includes virtual RAM (vRAM) $120_1$-$120_N$. Alternatively, embodiments may be implemented in a host computer system that is configured with standalone host operating system that supports one or more applications. It should be recognized that hypervisor 114 may be a hosted or a bare-metal hypervisor. In addition, virtual computing instances other than virtual machines 102, e.g., containers that do not have an operating system (e.g. a Docker container available at www.docker.com), may be executed in host computer system 100 in place of virtual machines 102. Each of virtual machines 102 has virtual RAM allocated thereto so that it can carry out tasks of guest operating systems (GOS) $106_1$-$106_N$ and Quest applications $108_1$-$108_N$ executing therein. Virtual RAM 120 allocated to each virtual machine 102 is backed by physical memory 110. In the system depicted, hypervisor 114 (or the host operating system, in the example where it is a standalone operating system or the hypervisor is hosted) (hereinafter referred to as the "system software") receives and processes interrupts including non-maskable interrupts.

Figure 2:
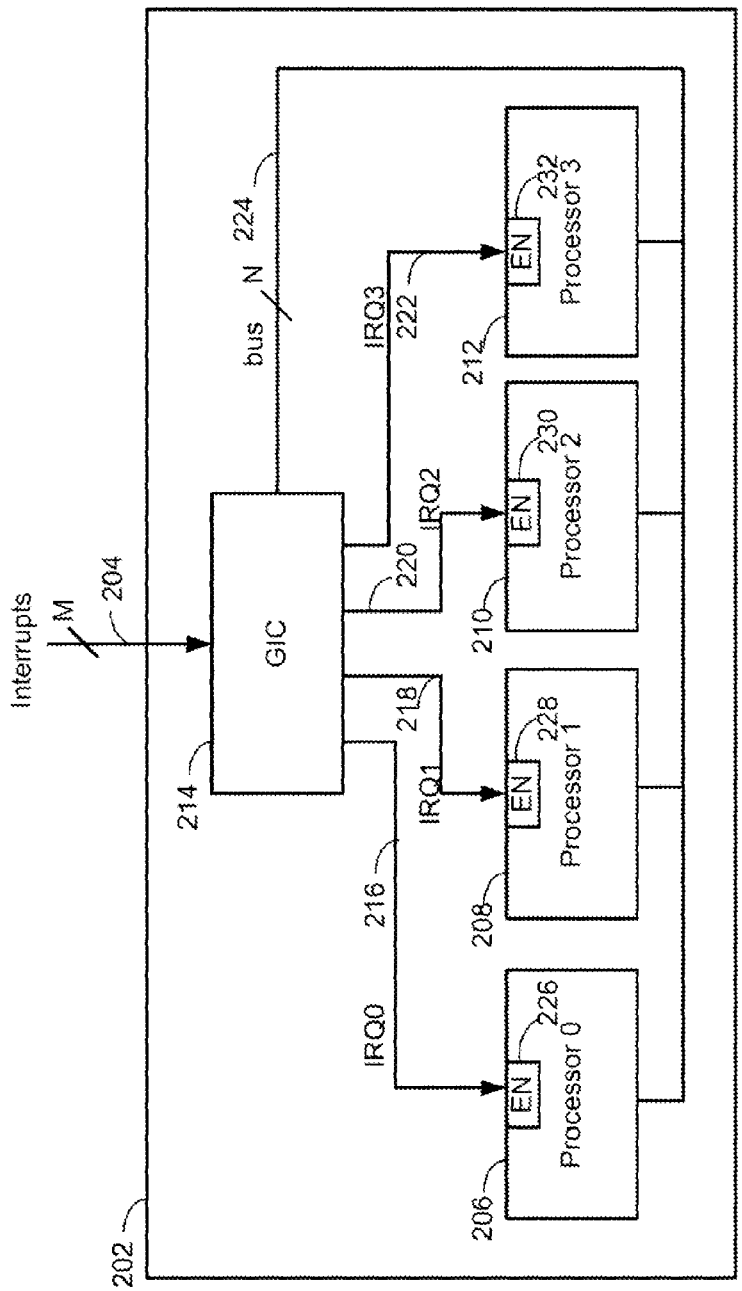
FIG. 2 depicts a typical a four-core ARM processor with an integral GIC.

In the embodiments described herein, CPU 116 in host computer system 100 is a multi-core ARM®64 processor. FIG. 2 depicts one example of a typical multi-core ARM®64 processor 202 with an integral GIC 214. Processor 202 includes processor cores 206, 208, 210, 212, and a GIC 214. GIC 214 receives interrupts 204 from outside processor 202 or from software executing in processor 202 via bus 224, and decides how to distribute the interrupts according to known mechanisms in GIC 214 to one or more of processor cores 206, 208, 210, 212. As mentioned above, each processor core 206, 208, 210, 212 can receive a regular interrupt (IRQ). That is, processor core 206 is configured to receive IRQ0 interrupt 216, processor core 208 to receive IRQ1 interrupt 218, processor core 210 to receive IRQ2 interrupt 220, and processor core 212 to receive IRQ3 interrupt 222. GIC 214 and processor cores 206, 208, 210, 212 communicate with each other through bus 224 that is N-bits wide. Bus 224 permits processor cores 206, 208, 210, 212 to either read or write internal registers in GIC 214. Each of processor cores 206, 208, 210, 212 also includes an enable bit 226, 228, 230, 232, which determines whether the respective processor core has enabled or disabled its own interrupts. If the interrupts are disabled, the corresponding processor core does not respond to a signal asserted on its interrupt pin. If interrupts are enabled, then the processor is able to respond to a signal asserted on its interrupt pin. In the example of ARM®64 processor, a write to a CPU state register, known as the DAIF register, that sets the I bit disables interrupts, and a write that clears the I bit enables interrupts. Hereinafter, the discussion will focus on system software running on processor core 206 as the agent receiving an interrupt from GIC 214 and communicating with GIC 214 over bus 224 during the interrupt servicing. It should be understood that system software on any one of the processor cores can receive and process an interrupt in the various manners described below.

Figure 3:
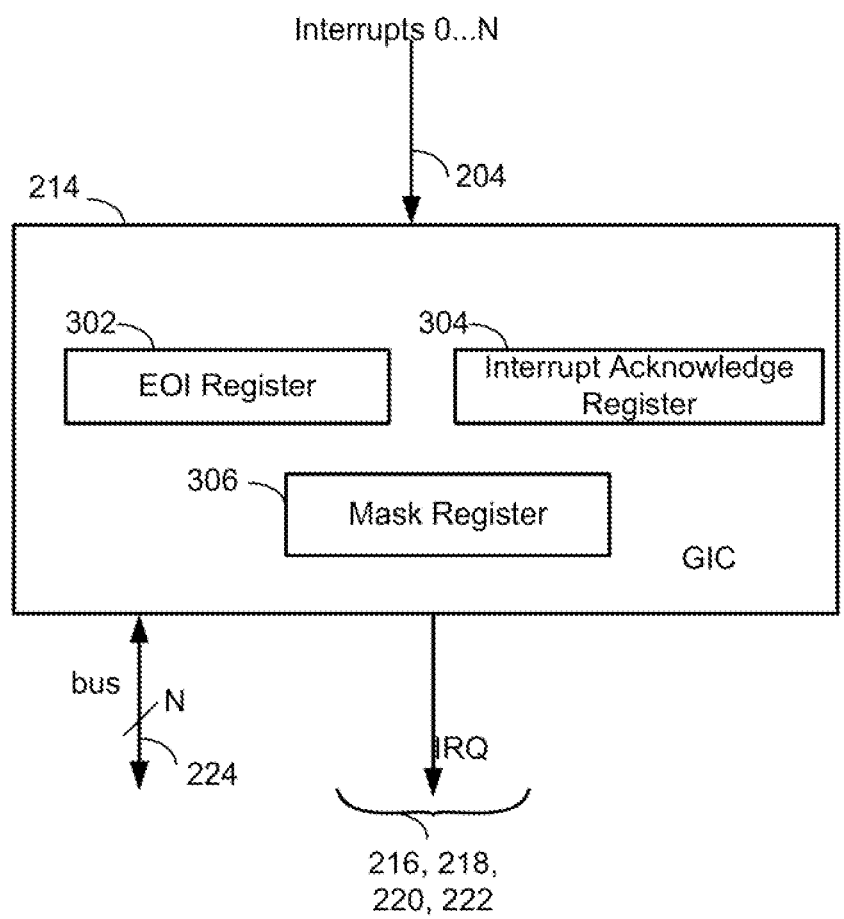
FIG. 3 depicts the GIC including certain internal registers.

FIG. 3 depicts GIC 214 with certain internal registers. GIC 214 as depicted in FIG. 3 includes a priority mask register (PMR) 306, an interrupt acknowledge register (IAR) 304 and an end-of-interrupt register (EOIR) 302. PMR 306 is a readable and writable register that functions as an interrupt priority filter. This means that only interrupts with higher priority than the value in the register are signaled to the processing core 206. In one configuration, GIC 214 supports 256 priority levels using an 8-bit field in PMR 306. IAR 304 is a readable register that provides an interrupt ID of the interrupt in a 10-bit field. The interrupt ID is also known as the interrupt vector and is an integer number. EOIR 302 is a writable register which, when written, informs GIC 214 that system software has completed processing of a particular interrupt. Writing the register permits another interrupt to be signaled to system software. A write to EOIR 302 must correspond to the most recent valid read from IAR 304, where a valid read is one that returns a valid interrupt vector (i.e., not a spurious interrupt vector which has all bits of its 10-bit ID set to 1). A 10-bit value is written to EOIR 302, and this 10-bit value corresponds, bit for bit, to the 10-bit field in IAR 304.

Figure 4:
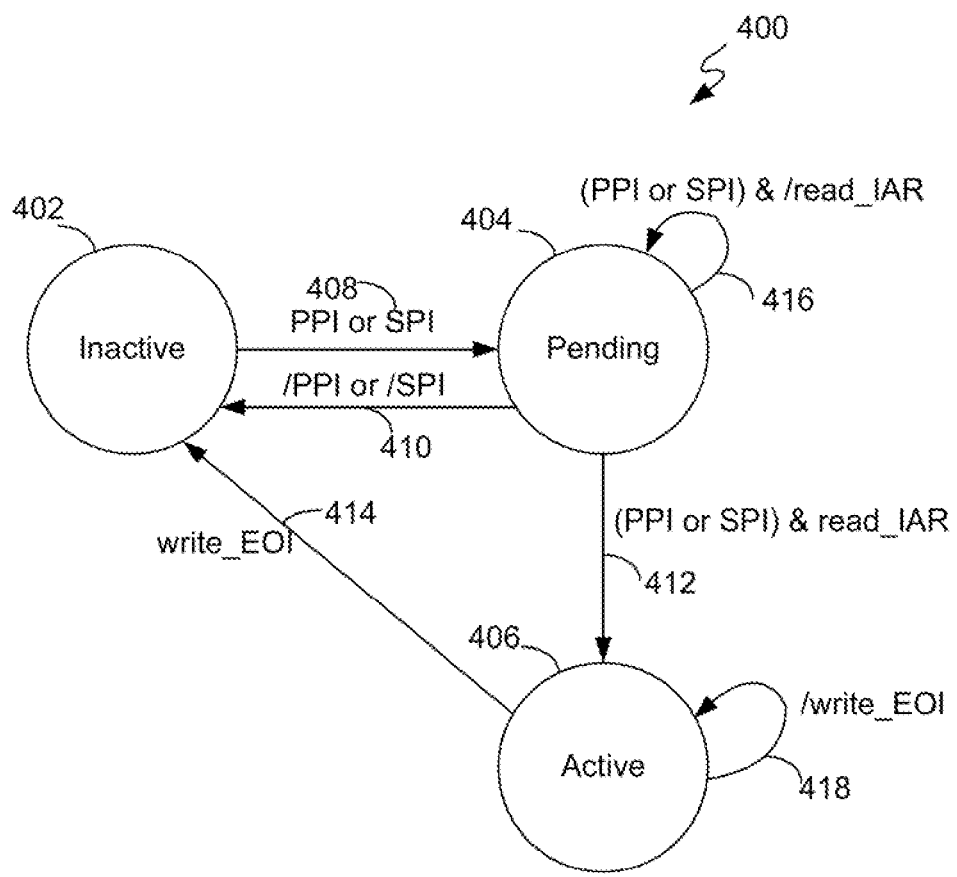
FIG. 4 depicts interrupt states in the GIC and transitions between the various states in a state diagram.

FIG. 4 depicts an internal state machine 400 in GIC 214 that defines various states of an interrupt in GIC 214 and the transitions between the various states. In accordance with the diagram, an interrupt can be in an inactive state 402, a pending state 404, or an active state 406. Inactive state 402 means that the interrupt is neither pending 404 nor active 406. Pending state 404 means that an interrupt from an external source is recognized as asserted to GIC 214 in the hardware, and is awaiting service by system software. Active state 406 means that an interrupt from a source to GIC 214 has been acknowledged by system software and being serviced, but the servicing has not completed. Further, in accordance with the diagram, state machine 400 changes state from inactive 402 to pending 404 when an external interrupt PPI or SPI is asserted to GIC 214 (transition 408). State machine 400 changes state from pending 404 to inactive 402 when the external interrupt PPI or SPI is de-asserted (transition 410). State machine 400 remains in pending 404 while the PPI or SPI is asserted and IAR 304 is not read (transition 416). When IAR 304 is read while the PPI or SPI is asserted, state machine 400 transitions from pending 404 to active 406 (transition 412). If a PPI or SPI was asserted and then de-asserted during transition 412, then a race condition between the PPI or SPI and the read of IAR 304 is present and the interrupt is deemed to be spurious. In this case, the read of IAR 304 returns a spurious interrupt vector with all bits set to 1 (value=1023). Finally, state machine 400 waits until a write to EOIR 302 occurs (transition 418) and changes state from active 406 to inactive 402 when a write to EOIR 302 occurs (transition 414). Thus, in summary, processing of an interrupt includes the steps of reading the interrupt vector, handling the interrupt vector, and then performing an end-of-interrupt to end the interrupt processing.

In the embodiments that follow, system software, such as a hypervisor or host operating system, running on the processor core 206 operates in conjunction with GIC 214 to emulate an NMI while preserving the functions of regular interrupts. To perform the emulation, embodiments employ a disable_interrupts function, an enable_interrupts function, and an interrupt_exception function, along with auxiliary functions in some embodiments.

Figure 5A:
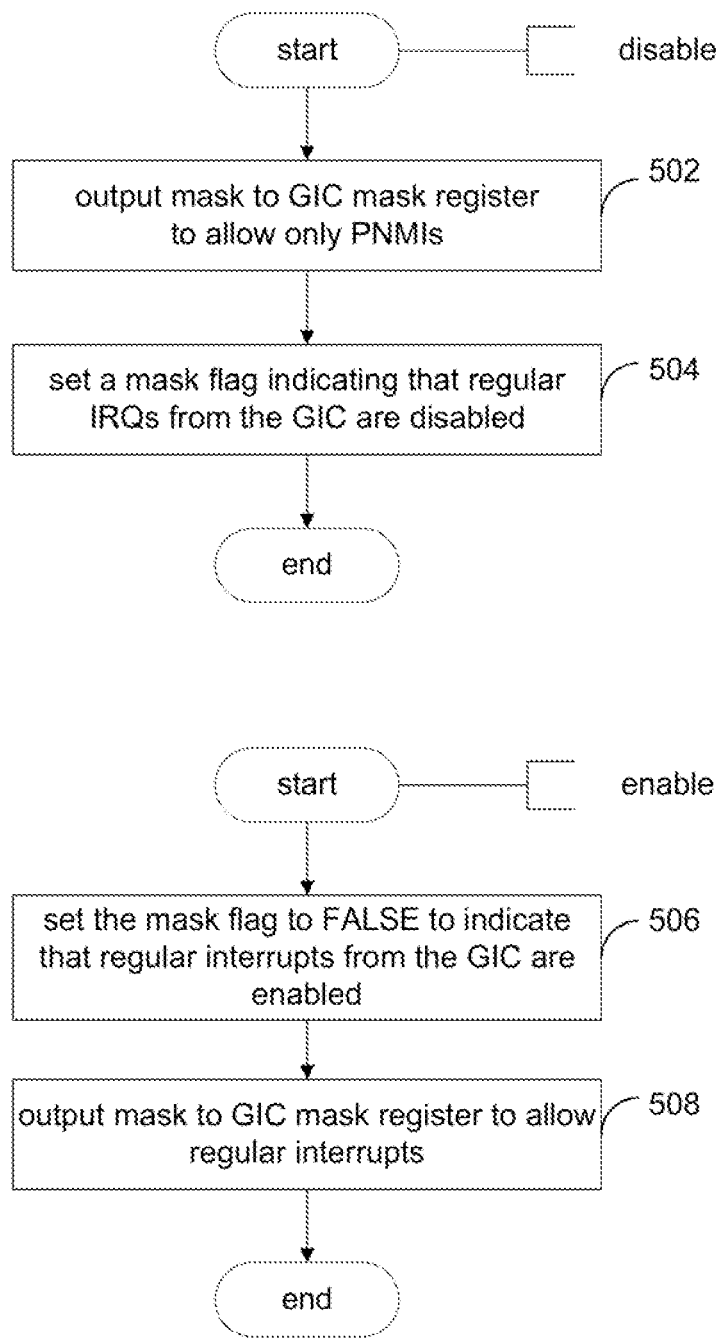
FIG. 5A depicts a control flow for disabling and enabling interrupts in a first embodiment.
Figure 5B:
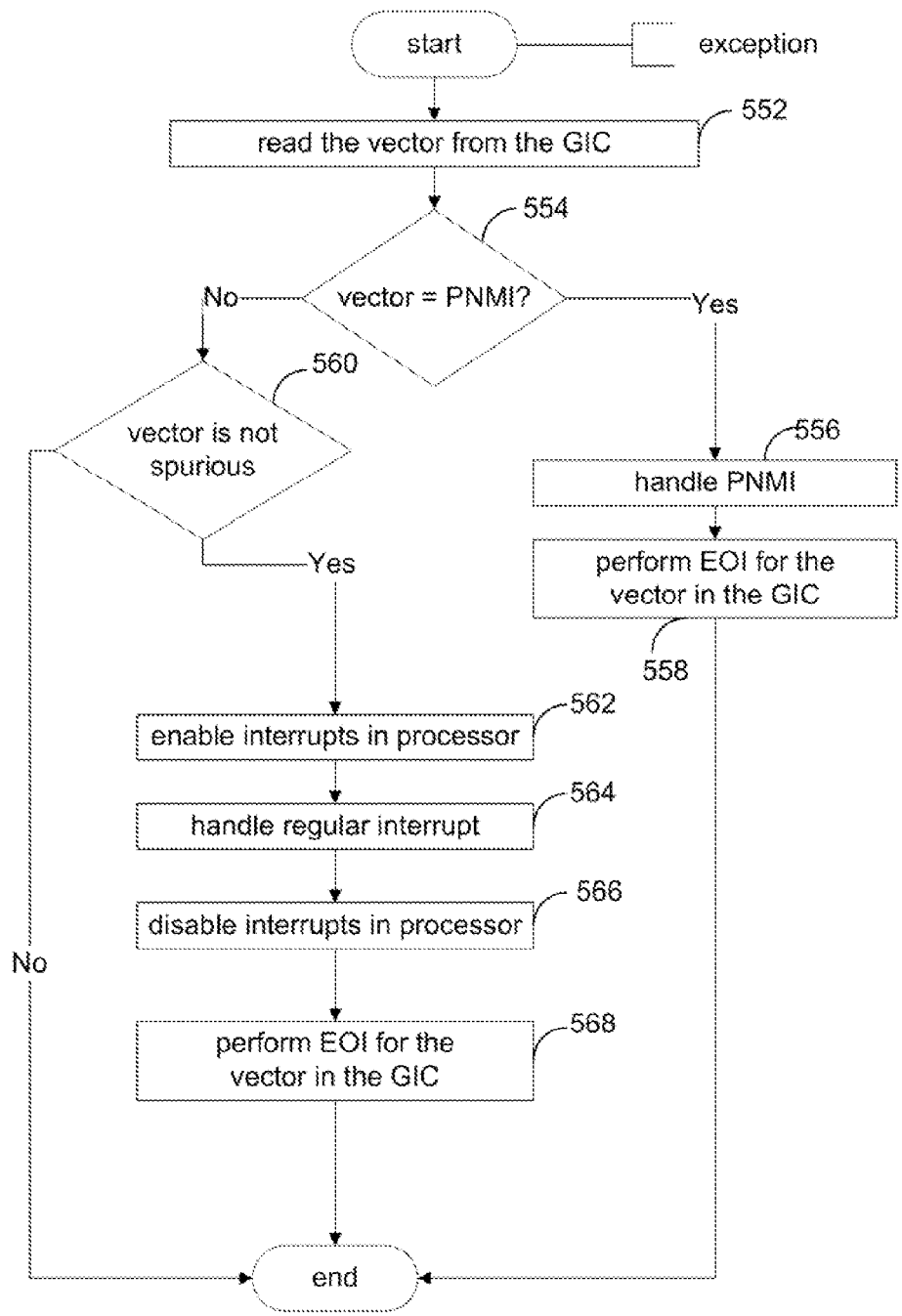
FIG. 5B depicts a control flow for handling an exception in the first embodiment.

FIGS. 5A and 5B illustrate a first embodiment for handling regular interrupts and a pseudo non-maskable interrupt (PNMI). The first embodiment employs three functions, disable_interrupts, enable_interrupts, and interrupt_exception, and generic_code_masked_IRQs flag. The system software employs the disable interrupts function to disable regular interrupts while it is executing certain critical sections of the kernel code. For other parts of the kernel code, the system software enables regular interrupts using the enable_interrupts function. System software thus uses these enable_interrupts and disable interrupts functions to control interrupt enabling and disabling for critical code sections instead of manipulating the processor core's I flag in the DAIF register. Manipulating the processor core's I flag for critical sections of code is now reserved for only a very small amount of architecture-specific code and is not used for the system software that is not architecture specific. The generic_code_masked_IRQs flag reflects the state of PMR 306. The generic_code_masked_IRQs flag can be read by system software to discover the state of PMR 306 in GIC 214 without having to read GIC 214, which for some GIC implementations can take hundreds of processor cycles. The flag may be stored in a memory area or in unused bits of a processor register. If the flag is stored in a memory area, it is preferred that the memory area be cacheable to avoid read/write latencies of the memory.

In the embodiments, regular interrupts are disabled and enabled but PNMIs are handled regardless of whether the regular interrupts are disabled or enabled. In addition, a PNMI is handled even though a regular interrupt may be in the process of being handled when the PNMI is signaled.

FIG. 5A illustrates steps of a method for disabling regular interrupts. According to this method, system software writes a mask to PMR 306 to disable regular interrupts (step 502), and also sets the generic_code_masked_IRQs flag to TRUE to reflect the fact that regular IRQs are disabled (step 504). As a result, only PNMIs can be delivered. The mask written to PMR 306 to disable regular interrupts is a constant, NMI_PRIORITY, whose value is such that PMR 306 in GIC 214 allows only the highest priority interrupt (i.e., PNMIs) to be signaled to system software. In one example, NMI_PRIORITY=1022.

FIG. 5A also illustrates steps of a method for enabling regular interrupts. According to this method, system software sets the generic_code_masked_IRQs flag to FALSE to indicate that regular interrupts are not masked (step 506) and also writes a mask to PMR 306 to allow regular interrupts (step 508). The mask written to PMR 306 to enable regular interrupts is a constant, IRQ_PRIORITY, whose value is such that PMR 306 in GIC 214 allows all regular interrupts to be signaled to system software. In one example, IRQ_PRIORITY=0.

FIG. 5B depicts a control flow for handling an exception in the first embodiment. It should be recognized that when processor core 206 receives an interrupt, it will automatically clear the enable bit 226 in the processor core 206 so that it can handle the received interrupt without being interrupted again. The exception control flow of the first embodiment begins in step 552, where system software reads the interrupt vector from IAR 304. In step 554, system software determines whether the interrupt vector is a PNMI or not based on the integer number of the vector. For example, in one embodiment, if the integer number of the vector is 1022, then the interrupt vector is considered a PNMI, but if the integer number is less than 1022, the interrupt is considered a regular interrupt. In other embodiments, a different integer vector may be assigned as the PNMI vector. If the interrupt vector is a PNMI, then system software executes the PNMI handler function in step 556, after which the system software performs a write to EOIR 302 in step 558 with the same number as the interrupt vector read from the IAR to indicate to GIC 214 that the interrupt is serviced.

Alternatively, if in step 554 system software determines that the interrupt vector is not a PNMI, then system software determines whether or not the interrupt vector is spurious in step 560, where a spurious interrupt vector is considered to be one that has a value of 1023. If the interrupt vector is not spurious, system software enables interrupts in processor core 206 in step 562. The enabling of interrupts in processor core 206 in step 562 allows a PNMI to be handled even though a regular interrupt is being processed. System software then executes the regular interrupt service routine in step 564, and disables interrupts in processor core 206 in step 566. Then system software writes to EOIR 302 in step 568 with the same number as the interrupt vector read in step 552 from GIC 214 to indicate that the interrupt is serviced.

Figure 6A:
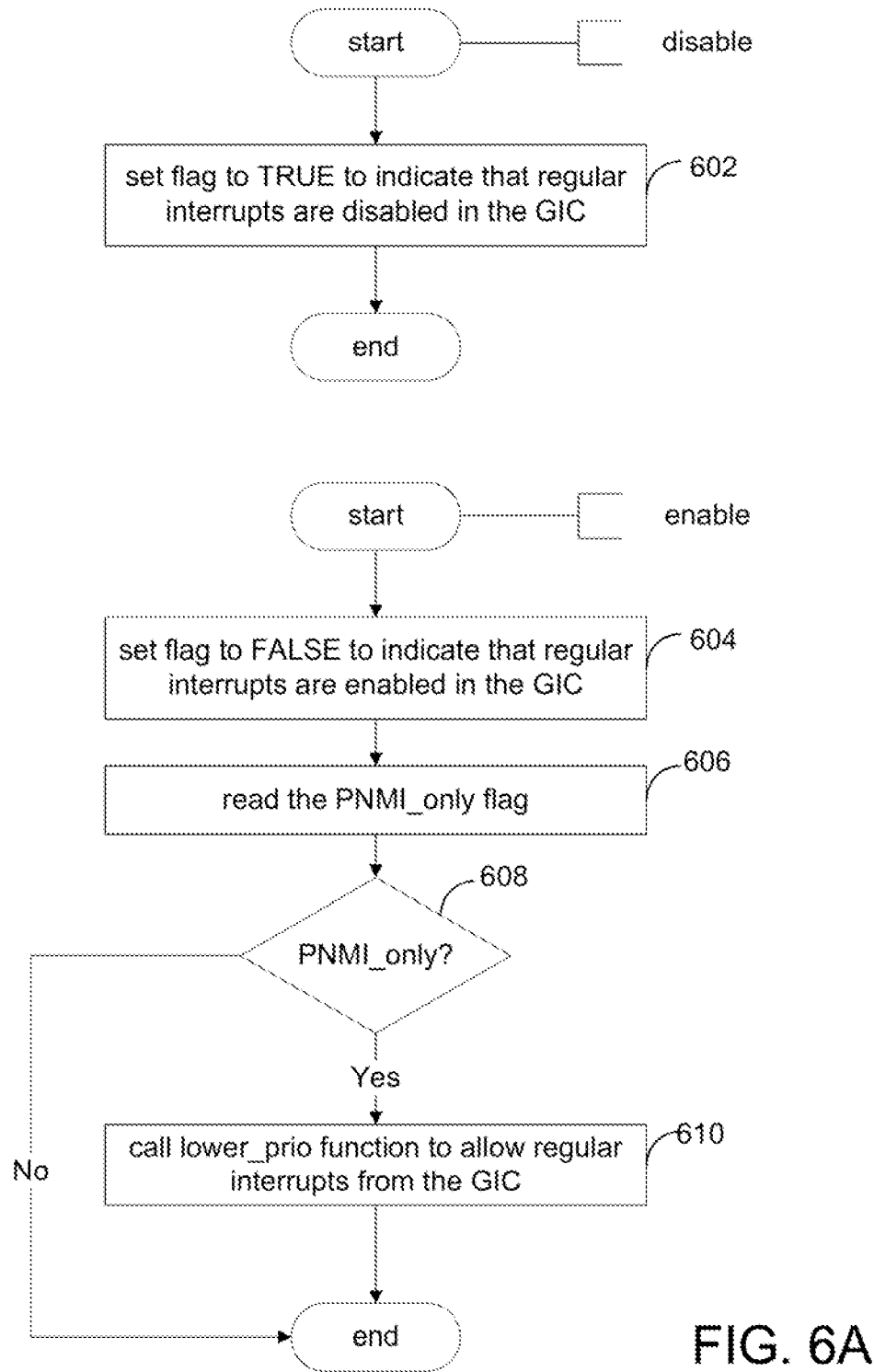
FIG. 6A depicts a control flow for disabling and enabling interrupts in a second embodiment.
Figure 6B:
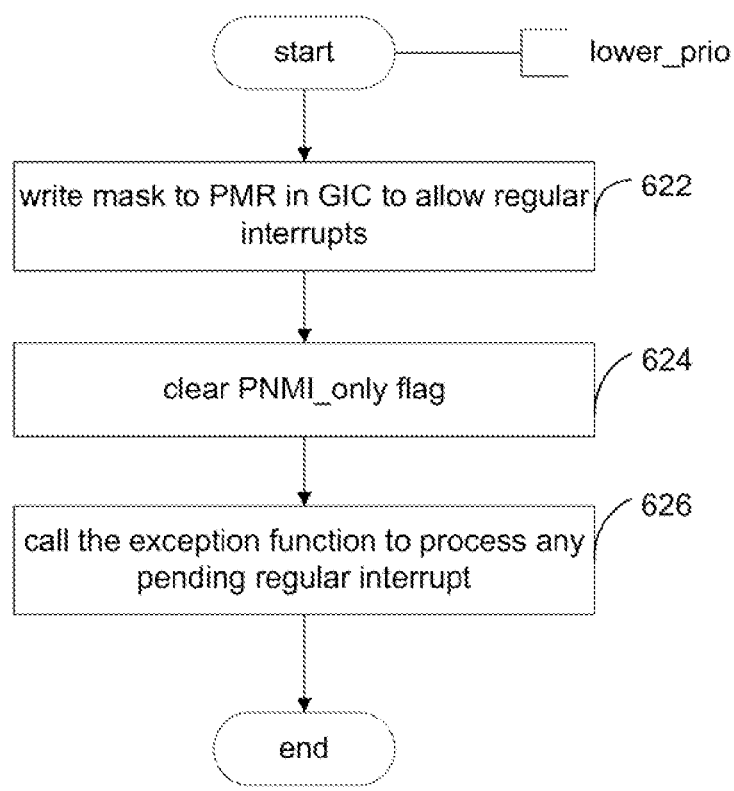
FIG. 6B depicts a function for allowing regular interrupts from the GIC.
Figure 6C:
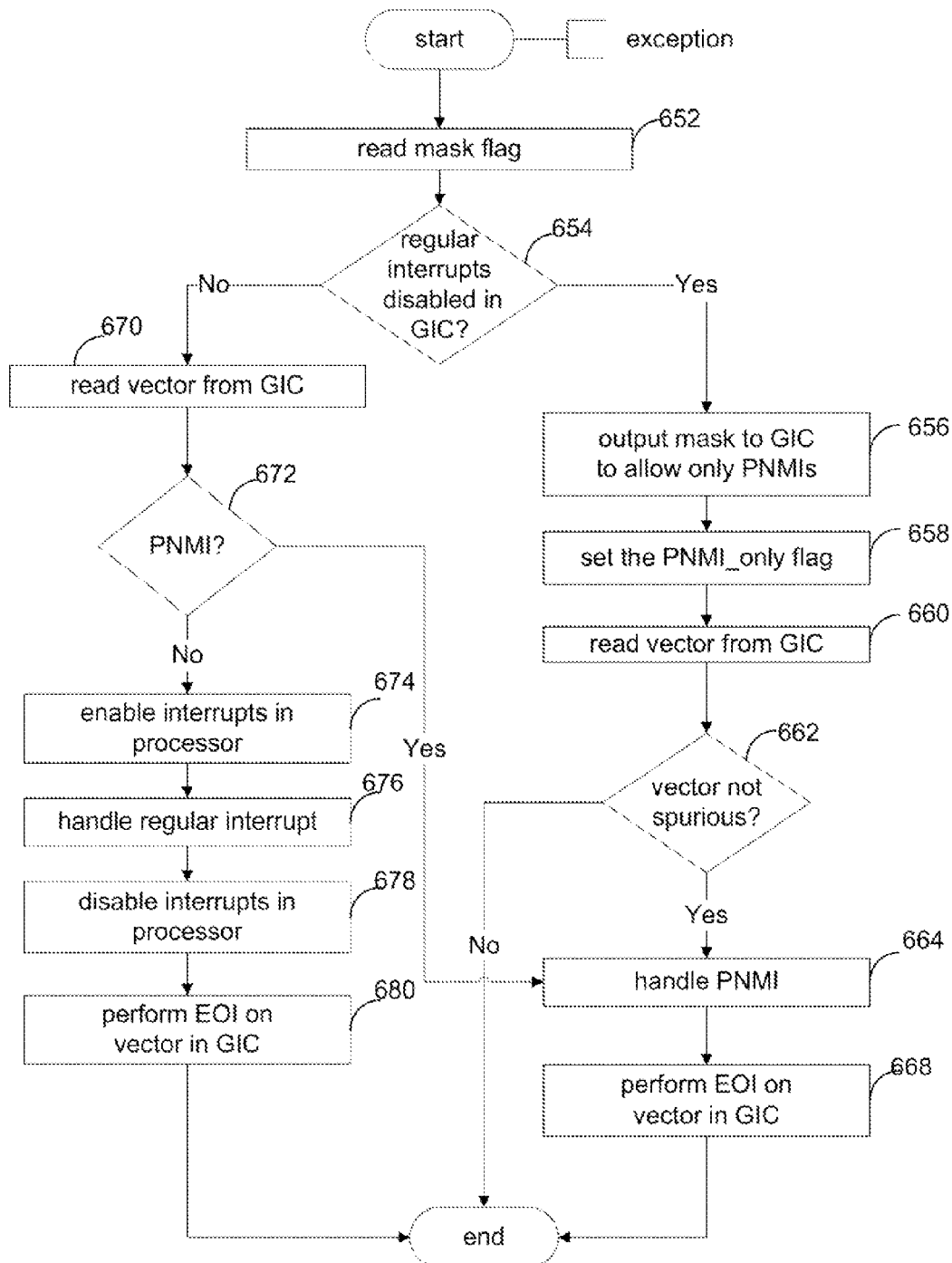
FIG. 6C depicts a control flow handling an exception in the second embodiment.

FIGS. 6A, 6B and 6C depict a second embodiment, which improves performance by decreasing the number of write operations to PMR 306. The second embodiment relies on the flag described above, generic_code_masked_IRQs, and a new flag, PMR_PNMI_only, which is set when only PNMIs are allowed. These flags can be stored in either memory or a processor register. To reduce latency to access the flags, it is preferred that the memory be cached or that the processor register be hardware available.

As shown in FIG. 6A, system software sets the generic_code_masked_IRQs flag to TRUE in step 602 to disable regular interrupts in GIC 214. To enable regular interrupts, system software sets the generic_code_masked_IRQs to FALSE in step 604 and then checks a flag, PMR_PNMI_only, in step 606, to determine if it is set (step 608). If it is set, PMR 306 needs to be updated to allow regular interrupts. To do so, system software calls lower_prio( ) function in step 610. If it is not set, PMR 306 does not need to be updated.

FIG. 6B depicts steps of a method for performing the lower_prio( ) function. In step 622, system software writes a mask value IRQ_PRIORITY to PMR 306 to allow regular interrupts. In step 624, system software sets the PMR_PNMI_only flag to FALSE. In step 626, system software immediately calk the interrupt_exception function (depicted in FIG. 6C) to process any external or software interrupts asserted to GIC 214 now that regular interrupts have been enabled in GIC 214.

FIG. 6C depicts a control flow for handling an exception in the second embodiment. When processor core 206 receives an asserted IRQ, processor core 206 internally processes the received interrupt, which includes disabling interrupts in processor core 206 by turning off enable bit 226. The exception control flow of the second embodiment begins in step 652, where system software reads the state of the generic_code_masked_IRQs flag. Then, in step 652, system software determines whether or not interrupts in GIC 214 are disabled. If interrupts are disabled as determined by the state of the generic_code_masked_IRQs flag, system software in step 656 writes PMR 306 to allow only PNMIs and in step 658 sets the PNMI_only flag to TRUE, so that the contents of PMR 306 and the PNMI only flag are consistent with each other. Then, in step 660 system software reads IAR 304 to obtain the PNMI vector, and then handles the PNMI in step 664 after making sure in step 662 that the PNMI vector is not spurious. After handling the PNMI, processor 202 writes EIOR 302 with the same number as the PNMI vector in step 668 and returns the just serviced interrupt to the inactive state.

On the other hand, if it is determined in step 654 that interrupts are enabled in GIC 214, the pending interrupt can be either a PNMI or a regular interrupt. If the pending interrupt is a PNMI as determined in step 672, system software processes the pending interrupt as a PNMI in steps 664 and 668. If the pending interrupt is a regular interrupt as determined in step 672, system software running on processor core 206 enables interrupts in processor core 206 in step 674, handles the regular interrupt in step 676, disables the interrupts in step 678, and then performs an end-of-interrupt on the interrupt vector in step 680 by writing EIOR 302 with the same number as the interrupt vector of the just serviced interrupt.

Thus, the second embodiment relies on the flags to reflect the state of PMR 306 instead of accessing GIC 214 to read contents of PMR 306. Only if system software discovers during the exception that the flag indicates that regular interrupts should be disabled in GIC 214, does the system software write to PMR 306 with a value NMI_PRIORITY setting the PMR to only allow PNMIs and in step 658 set the PNMI_only flag to TRUE. Also, when enabling interrupts, system software updates (i.e., writes to) PMR 306 only if it discovers that PNMI_only flag is set. This avoids many of the writes to PMR 306 that occur in the first embodiment.

Figure 7A:
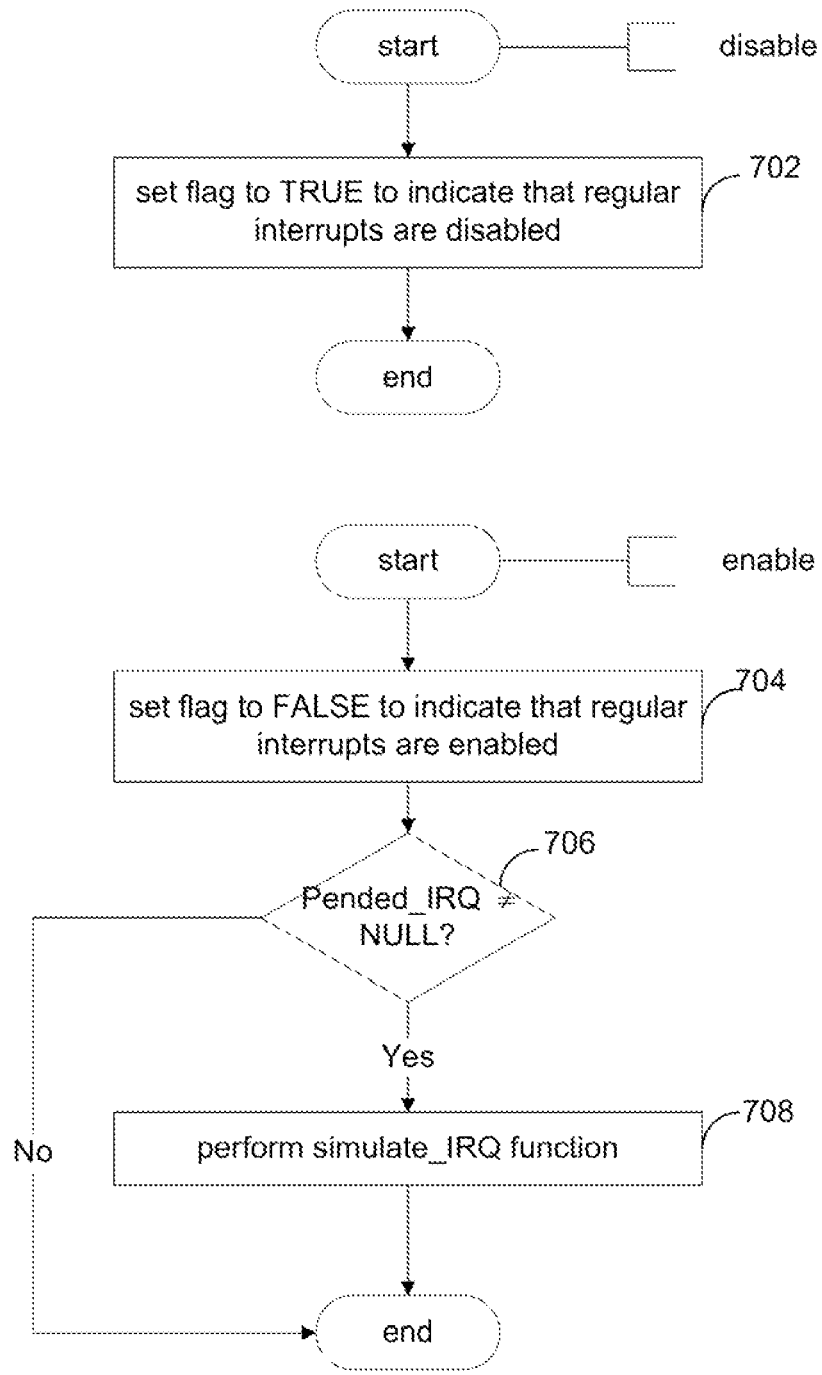
FIG. 7A depicts a control flow for disabling and enabling interrupts in a third embodiment.
Figure 7B:
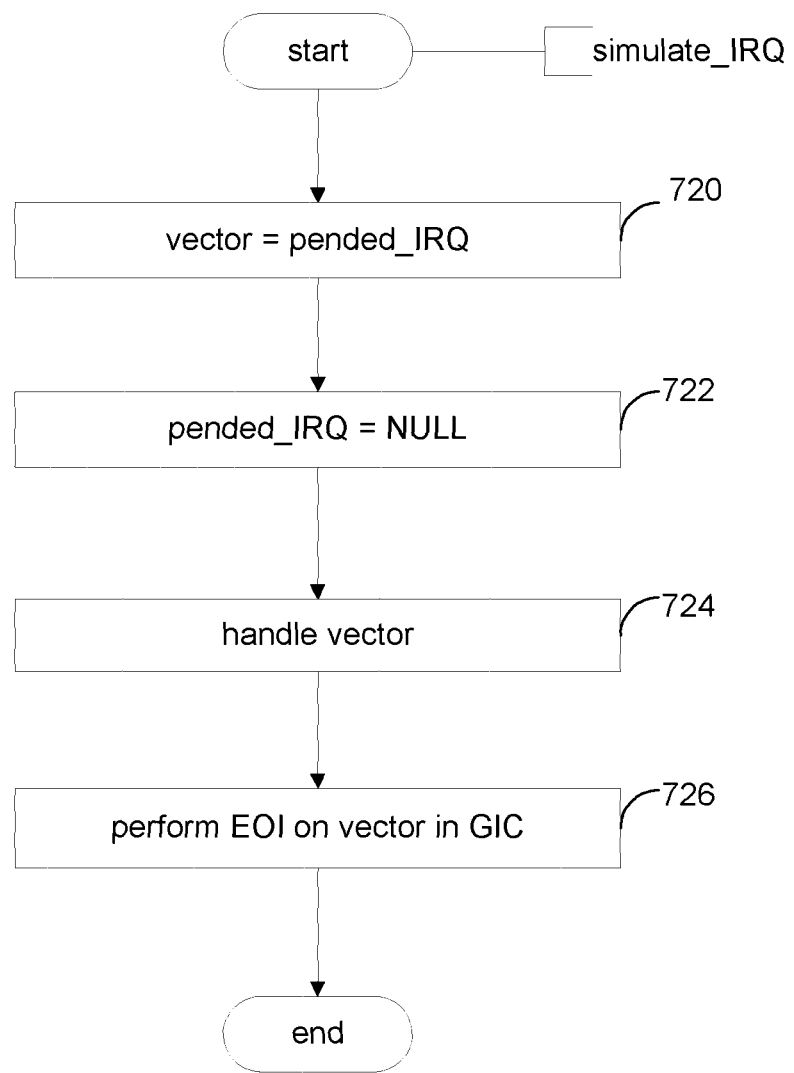
FIG. 7B depicts a control flow for simulating an IRQ in the third embodiment.
Figure 7C:
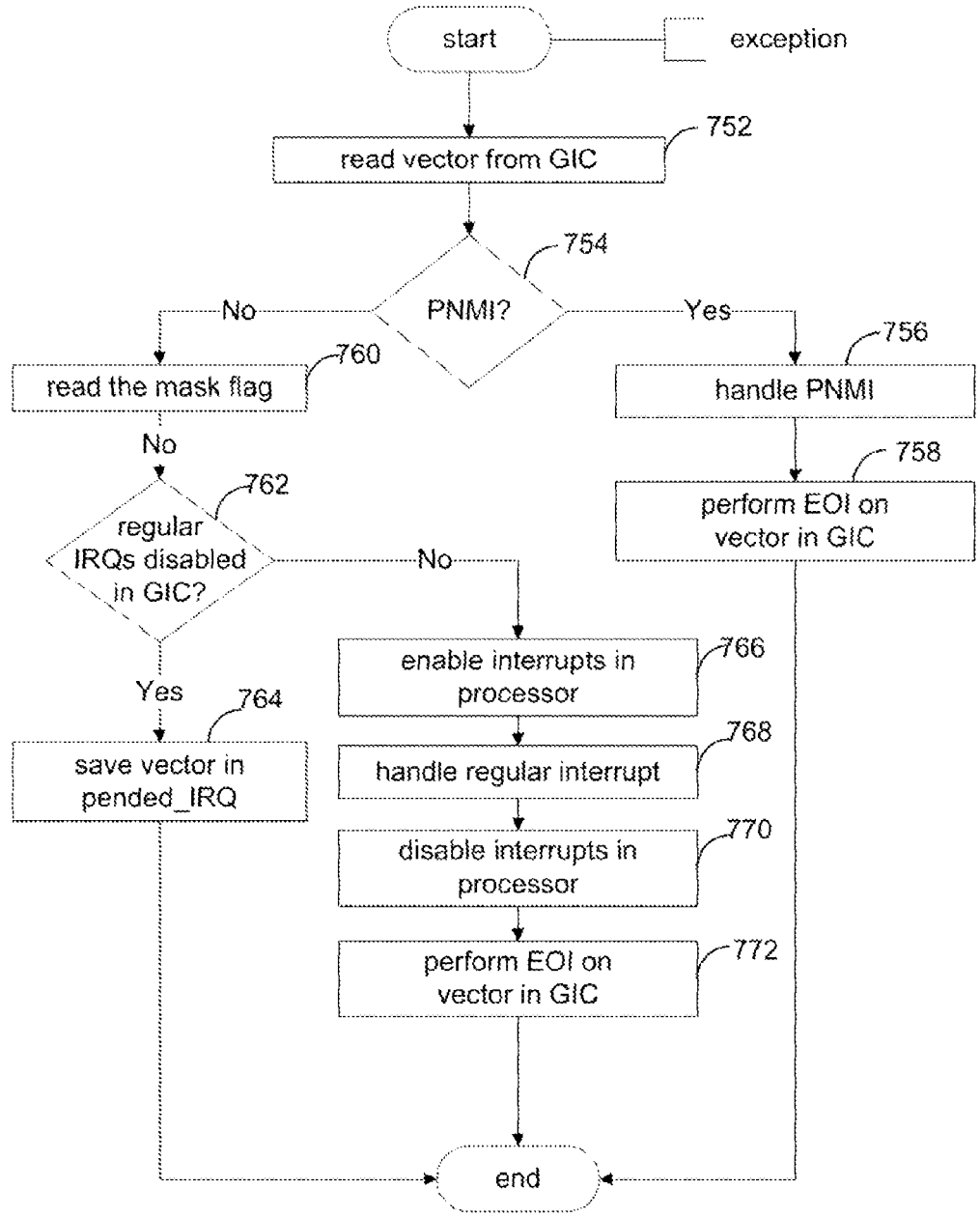
FIG. 7C depicts a control flow for handling an exception in the third embodiment.

FIGS. 7A, 7B and 7C illustrate a third embodiment that improves performance by completely avoiding writes to PMR 306. The third embodiment uses the generic_code_masked_IRQs flag and a variable, pended_IRQ, for saving an interrupt vector. The flag and variable can be stored in memory or a processor register. If stored in memory, it is preferred that the memory be cacheable. If stored in a processor register, it is preferred that the register be available and have low latency access.

FIG. 7A depicts a control flow for disabling and enabling interrupts in a third embodiment. To disable interrupts, system software sets in step 702 the generic_code_masked_IRQs flag to TRUE. To enable interrupts, system software sets the generic_code_masked_IRQs flag to FALSE (step 704) and checks a variable, pended_IRQ, which contains either a saved interrupt vector or a NULL vector (step 706). If the variable contains a saved interrupt vector, system software calls a simulate_IRQ( ) function to handle the saved interrupt vector. Thus, in the third embodiment, system software relies only on the generic_code_masked_IRQs flag to indicate the state of GIC 214.

FIG. 7B depicts a control flow for simulating an IRQ in the third embodiment. The simulate_IRQ( ) function operates to process an interrupt vector that was saved when a previous exception was handled. In step 720, system software obtains the saved interrupt vector from the pended_IRQ variable, and stores a NULL vector in the variable in step 722. In step 724, system software calls the interrupt handler for the saved interrupt vector, after which it writes to EOIR 302 in step 726 with the same number as the saved interrupt vector to return the interrupt to the inactive state. The simulate_IRQ( ) function in one version is a system call. In another version, the simulate_IRQ( ) function is a hypercall or a secure monitor call.

FIG. 7C depicts a control flow for handling an exception in the third embodiment. As explained above, when the processor core receives an asserted IRQ, the processor core 206 internally processes the received interrupt, which includes disabling interrupts in the processor core 206 by turning off enable bit 226. The system software then enters the exception control flow depicted in FIG. 7C. In step 752, system software reads IAR 304 to acknowledge the interrupt and obtain the interrupt vector. It the interrupt vector is a PNMI as determined in step 754 based on the integer number of the vector, then system software handles the PNMI and writes to EIOR 302 with the interrupt vector to return the interrupt to the inactive state.

On the other hand, if the interrupt vector is a regular interrupt as determined in step 754, system software reads the generic code masked IRQ s flag in step 760. If the flag indicates in step 762 that regular interrupts are disabled in GIC 214, then the interrupt vector is saved in step 764 in the pended_IRQ variable for later processing. The interrupt will be processed in step 708 of FIG. 7A as a regular interrupt when interrupts in GIC 214 are enabled. It should be recognized that when the interrupt vector is saved, the interrupt in GIC 214 has been acknowledged, but no end-of-interrupt has been performed. In this condition, GIC 214 itself prevents interrupts at the same or lower priority, but still allows a PNMI because it has the highest priority.

If the generic_code_masked_IRQs flag is not set as determined in step 762, then the interrupt is processed by system software running on processor core 206 enabling interrupts in processor core 206 in step 766, handling the regular interrupt in step 768, disabling interrupts in processor core 206 in step 770, and then writing to EOIR 302 with the interrupt vector in step 772 to return the interrupt to the inactive state.

Thus, in the third embodiment, the exception function only handles PNMI exceptions if the generic_code_masked_IRQs flag is set. Additionally, no writes to PMR 306 occur, thereby avoiding the slow operations in GIC 214. Instead of writing masks to PMR 306 in GIC 214, the third embodiment relies on GIC 214 to automatically raise the priority level in PMR 306 when processor 202 reads IAR 304 and to lower the priority level in PMR 306 when processor 202 performs a write to EOIR 302. Thus, only interrupts having higher priority than the interrupt vector just read from IAR 304 can occur during the exception processing.

In conclusion, assigning the highest priority interrupt to an interrupt in GIC 214 as the PNMI causes the PNMI to take precedence over regular interrupts and to be deliverable even when regular interrupts are disabled in GIC 214. In addition, because software executing in one of multiple processing cores can generate an SPI, the PNMI can be delivered to any processor as an inter-processor interrupt.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-field devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for handling interrupts in a processor, the interrupts including regular interrupts having a range of priorities and a pseudo non-maskable interrupt (PNMI) that is of a higher priority than any of the regular interrupts, the method comprising:
   obtaining an interrupt vector corresponding to a received interrupt;
   if the received interrupt is a PNMI, executing a PNMI interrupt handler using the interrupt vector as an input thereto; and
   if the received interrupt is a regular interrupt, reading a mask flag that indicates whether regular interrupts are enabled in an interrupt controller and further;
      if the mask flag indicates that regular interrupts are enabled in the interrupt controller, enabling interrupts in the processor so that a PNMI can be received while handling the regular interrupt, executing a regular interrupt handler using the interrupt vector as an input thereto, and disabling interrupts in the processor; and
      if the mask flag indicates that regular interrupts are disabled in the interrupt controller, saving the interrupt vector for subsequent handling.

2. The method of claim 1, wherein the received interrupt is determined to be a PNMI based on the interrupt vector.

3. The method of claim 1, further comprising:
   performing an end-of-interrupt operation on the interrupt vector after handling the interrupt vector.

4. The method of claim 1, further comprising:
   disabling regular interrupts in the interrupt controller during execution by setting the mask flag to TRUE.

5. The method of claim 1, further comprising:
   enabling regular interrupts in the interrupt controller by setting the mask flag to FALSE.

6. The method of claim 5, further comprising:
   if there is a saved interrupt vector at the time of enabling the regular interrupts in the interrupt controller, handling the saved interrupt vector.

7. The method of claim 6, wherein handling the saved interrupt vector includes:
   obtaining the saved interrupt vector from a saved-vector variable and then removing the saved interrupt vector from the variable;
   executing a regular interrupt handler using the saved interrupt vector as an input thereto; and
   performing an end-of-interrupt operation on the interrupt vector after handling the interrupt vector.

8. A computer program product stored in a non-transitory computer readable storage medium and comprising instructions that cause a processor of a computer system to perform a method for handling interrupts, the interrupts including regular interrupts having a range of priorities and a pseudo non-maskable interrupt (PNMI) that is of a higher priority than any of the regular interrupts, the method comprising:
   obtaining an interrupt vector corresponding to a received interrupt;
   if the received interrupt is a PNMI, executing a PNMI interrupt handler using the interrupt vector as an input thereto; and
   if the received interrupt is a regular interrupt, reading a mask flag that indicates whether regular interrupts are enabled in an interrupt controller and further;
      if the mask flag indicates that regular interrupts are enabled in the interrupt controller, enabling interrupts in the processor so that a PNMI can be received while handling the regular interrupt, executing a regular interrupt handler using the interrupt vector as an input thereto, and disabling interrupts in the processor; and
      if the mask flag indicates that regular interrupts are disabled in the interrupt controller, saving the interrupt vector for subsequent handling.

9. The computer program product of claim 8, wherein the received interrupt is determined to be a PNMI based on the interrupt vector.

10. The computer program product of claim 8, wherein the method further comprises:
    performing an end-of-interrupt operation on the interrupt vector after handling the interrupt vector.

11. The computer program product of claim 8, wherein the method further comprises:
    disabling regular interrupts in the interrupt controller during execution by setting the mask flag to TRUE.

12. The computer program product of claim 8, wherein the method further comprises:
enabling regular interrupts in the interrupt controller by setting the mask flag to FALSE.

13. The computer program product of claim 12, wherein the method further comprises:
if there is a saved interrupt vector at the time of enabling the regular interrupts in the interrupt controller, handing the saved interrupt vector.

14. The computer program product of claim 13, wherein handling the saved interrupt vector includes:
obtaining the saved interrupt vector from a saved-vector variable and then removing the saved interrupt vector from the variable;
executing a regular interrupt handler using the saved interrupt vector as an input thereto; and
performing an end-of-interrupt operation on the interrupt vector after handling the interrupt vector.

15. A computer system comprising:
a bus;
an interrupt controller coupled to the bus, wherein the interrupt controller receives external and software-generated interrupts, and includes a priority mask register whose contents act as a priority filter for the received interrupts, which include regular interrupts having a range of priorities and a pseudo non-maskable interrupt (PNMI) that is of a higher priority than any of the regular interrupts, and an interrupt acknowledge register, which when read provides an interrupt vector corresponding to a received interrupt, the interrupt vector being an integer number;
a processor coupled to the bus, wherein the processor receives an interrupt signal from the interrupt controller when the interrupt controller receives an external or software-generated interrupt; and
a memory coupled to the bus and containing a program that causes the processor to:
read an interrupt vector corresponding to a received interrupt;
if the received interrupt is a PNMI, execute a PNMI interrupt handler using the interrupt vector as an input thereto; and
if the received interrupt is a regular interrupt, read a mask flag that indicates whether regular interrupts are enabled in an interrupt controller and further;
if the mask flag indicates that regular interrupts are enabled in the interrupt controller, enable interrupts in the processor so that a PNMI can be received while handling the regular interrupt, execute a regular interrupt handler using the interrupt vector as an input thereto, and disable interrupts in the processor; and
if the mask flag indicates that regular interrupts are disabled in the interrupt controller, save the interrupt vector for subsequent handling.

16. The computer system of claim 15, wherein the received interrupt is determined to be a PNMI based on the interrupt vector.

17. The computer system of claim 15, wherein the program further causes the processor to:
perform an end-of-interrupt operation on the interrupt vector after handling the interrupt vector.

18. The computer system of claim 15, wherein the program further causes the processor to:
disable regular interrupts in the interrupt controller during execution by setting the mask flag to TRUE.

19. The computer system of claim 15, wherein the program further causes the processor to:
enable regular interrupts in the interrupt controller by setting the mask flag to FALSE; and
if there is a saved interrupt vector at the time of enabling the regular interrupts in the interrupt controller, handing the saved interrupt vector.

20. The computer system of claim 19, wherein handling the saved interrupt vector includes:
obtaining the saved interrupt vector from a saved-vector variable and then removing the saved interrupt vector from the variable;
executing a regular interrupt handler using the saved interrupt vector as an input thereto; and
performing an end-of-interrupt operation on the interrupt vector after handling the interrupt vector.

* * * * *